(12) United States Patent
Majima et al.

(10) Patent No.: US 8,578,618 B2
(45) Date of Patent: Nov. 12, 2013

(54) THREE-DIMENSIONAL MEASURING INSTRUMENT

(75) Inventors: Takashi Majima, Utsunomiya (JP);
Hideki Kumagai, Utsunomiya (JP);
Kazumi Mizukami, Mooka (JP);
Tomohiro Usui, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 190 days.

(21) Appl. No.: 13/179,783

(22) Filed: Jul. 11, 2011

(65) Prior Publication Data
US 2012/0023765 A1 Feb. 2, 2012

(30) Foreign Application Priority Data

Jul. 29, 2010 (JP) ................................. 2010-170405

(51) Int. Cl.
*G01B 5/004* (2006.01)
(52) U.S. Cl.
USPC .......................................................... 33/503
(58) Field of Classification Search
USPC ................................... 33/503, 504, 556, 559
See application file for complete search history.

(56) References Cited

U.S. PATENT DOCUMENTS

| | | | | |
|---|---|---|---|---|
| 4,492,356 A * | 1/1985 | Taniguchi et al. | ....... | 248/346.06 |
| 4,575,942 A * | 3/1986 | Moriyama | ..................... | 33/1 M |
| 5,040,431 A * | 8/1991 | Sakino et al. | ............. | 74/490.09 |
| 5,523,941 A * | 6/1996 | Burton et al. | .................... | 700/60 |
| 5,524,502 A * | 6/1996 | Osanai | ....................... | 74/490.07 |
| 5,699,621 A * | 12/1997 | Trumper et al. | ............... | 33/1 M |
| 7,271,879 B2 * | 9/2007 | Lim et al. | ........................ | 33/1 M |
| 7,478,481 B2 * | 1/2009 | Reynaerts et al. | ............. | 33/1 M |
| 2004/0263108 A1 * | 12/2004 | Lim et al. | ......................... | 33/568 |
| 2007/0277600 A1 * | 12/2007 | Nokuo et al. | .................. | 33/501 |
| 2008/0040941 A1 * | 2/2008 | Reynaerts et al. | ............. | 33/706 |
| 2009/0026995 A1 | 1/2009 | Uhl et al. | | |
| 2009/0190110 A1 * | 7/2009 | Shibazaki | ...................... | 33/706 |
| 2011/0066400 A1 | 3/2011 | Noda et al. | | |
| 2012/0023765 A1 * | 2/2012 | Majima et al. | .................. | 33/503 |
| 2012/0073154 A1 * | 3/2012 | Matsumiya et al. | ........... | 33/503 |
| 2012/0098660 A1 * | 4/2012 | Hoover et al. | ................. | 33/701 |

FOREIGN PATENT DOCUMENTS

JP 2009-527747 7/2009

OTHER PUBLICATIONS

U.S. Appl. No. 13/223,570 to Mitsuru Fukuda et al., filed Sep. 1, 2011.
U.S. Appl. No. 13/218,824 to Hideki Kumagai et al., filed Aug. 26, 2011.

* cited by examiner

*Primary Examiner* — Yaritza Guadalupe-McCall
(74) *Attorney, Agent, or Firm* — Greenblum & Bernstein, P.L.C.

(57) ABSTRACT

According to the present invention, a three-dimensional measuring instrument includes a spindle that moves an object to be controlled in a predetermined axis direction; and a controlling device that controls a position of the object to be controlled by controlling a position of the spindle. The three-dimensional measuring instrument further includes an absolute-type linear encoder that outputs an absolute position of the spindle. With this, it is possible to start measurement by the three-dimensional measuring instrument in a short period of time.

1 Claim, 1 Drawing Sheet

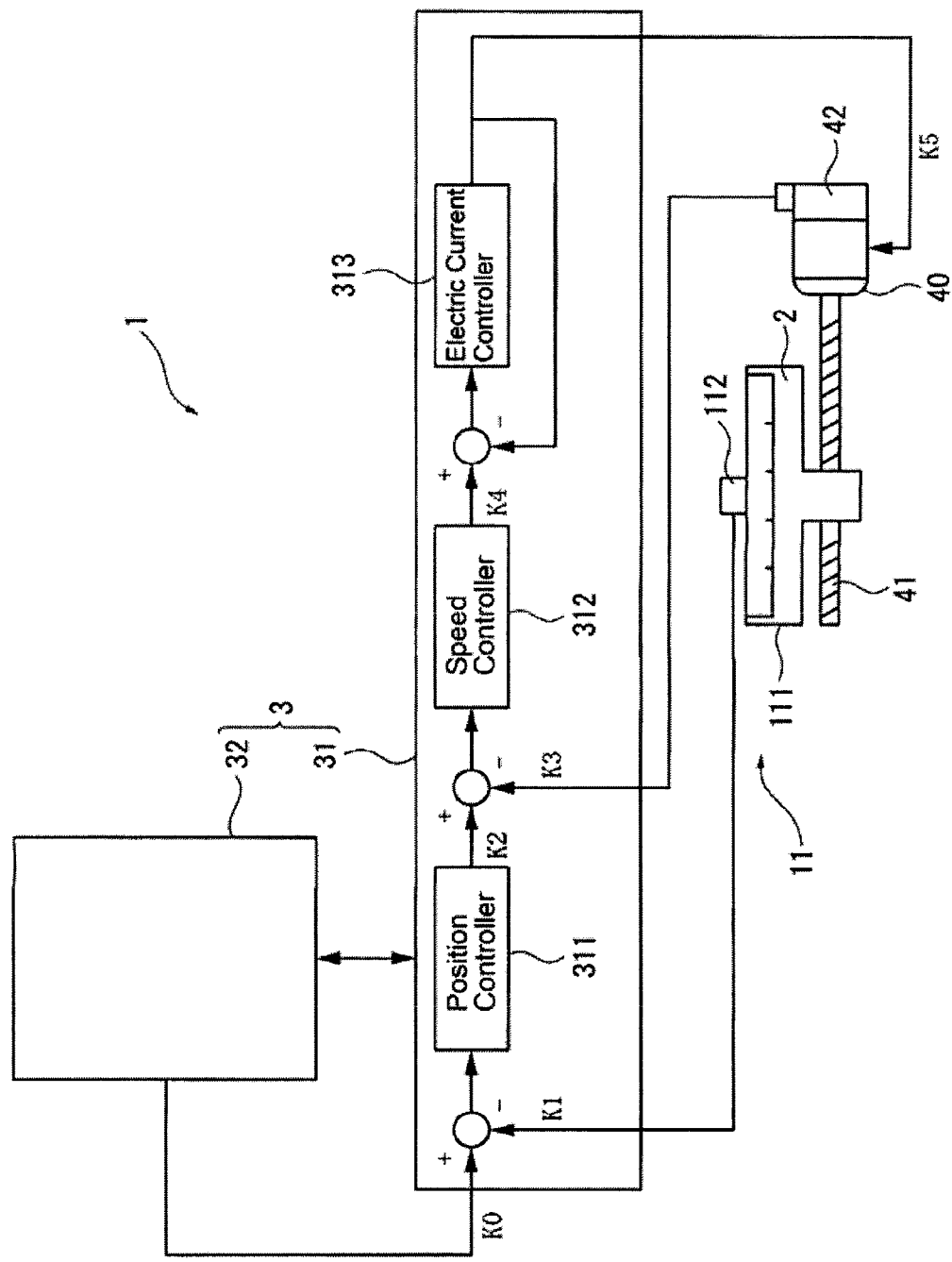

THREE-DIMENSIONAL MEASURING INSTRUMENT

CROSS-REFERENCE TO RELATED APPLICATIONS

The present application claims priority under 35 U.S.C. §119 of Japanese Application No. 2010-170405, filed on Jul. 29, 2010, the disclosure of which is expressly incorporated by reference herein in its entirety.

BACKGROUND OF THE INVENTION

1. Field of the Invention

The present invention relates to an industrial machine, and more particularly relates to a three-dimensional measuring instrument.

2. Description of Related Art

Conventionally, there is known a three-dimensional measuring instrument as an industrial machine having a moving mechanism that moves a probe as an object to be controlled, provided to measure a measured object, in an X-axis direction, a Y-axis direction, and a Z-axis direction perpendicular to each other; and a controlling device that controls a position of the probe by controlling a position of the moving mechanism (for example, see Related Art 1).

In such a three-dimensional measuring instrument, the moving mechanism has a portal frame as an X-axis direction moving mechanism that is provided in a vertical direction (Z-axis direction) to move the probe in the X-axis direction within a horizontal plane; a slider as a Y-axis direction moving mechanism that is provided in the Z-axis direction in a state of being movable along the Y-axis direction in a horizontal portion extending in the Y-axis direction of the portal frame to move the probe in the Y-axis direction; and a spindle as a Z-axis direction moving mechanism that is provided in the slider in a state of being movable along the Z-axis direction to support and move the probe in the Z-axis direction.

An incremental-type linear encoder is provided in each axis direction moving mechanism. A signal based on a position of each axis direction moving mechanism in each axis direction is sent from the linear encoder to the controlling device. Based on this signal, feedback control is performed to a position of the probe in each axis direction by the controlling device.

Related Art 1: Japanese Translation Publication of PCT International Application No. 2009-527747

However, in such a three-dimensional measuring instrument, since the incremental-type linear encoder is used, a position of the probe is not known immediately after power activation. In order to recognize the position of the probe in such a case, an operation is required to detect an original position of the linear encoder set in advance after the power activation of the three-dimensional measuring instrument, and it takes time to detect such a position. Consequently, it takes time to start measurement by the three-dimensional measuring instrument. This situation becomes significant when a position of the probe at the time of power activation is greatly apart from the original position of the linear encoder especially in a large-size three-dimensional measuring instrument.

SUMMARY OF THE INVENTION

An advantage of the present disclosure is to provide an industrial machine that eliminates a need for an operation to detect an original position of a linear encoder outputting a signal based on a position of a moving mechanism, and makes it possible to start measurement in a short period of time.

According to the present disclosure, a three-dimensional measuring instrument includes a moving mechanism that moves an object to be controlled in a predetermined axis direction; and a controlling device that controls a position of the objet to be controlled by controlling a position of the moving mechanism. The three-dimensional measuring instrument further includes an absolute-type linear encoder that outputs an absolute position of the moving mechanism.

With this configuration, the absolute position of the moving mechanism is known by the absolute-type linear encoder immediately after power activation of the industrial machine, and the absolute position of the object to be controlled is known based on the absolute position of the moving mechanism. Consequently, it is possible to eliminate the need for an operation to detect the original position of the linear encoder. It is thus possible to start measurement by the industrial machine in a short period of time.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein:

FIG. 1 is a block diagram illustrating a three-dimensional measuring instrument according to an embodiment of the present disclosure.

DETAILED DESCRIPTION OF THE INVENTION

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description is taken with the drawings making apparent to those skilled in the art how the forms of the present disclosure may be embodied in practice.

Embodiments of the present disclosure will be explained with reference to the attached drawing. As shown in FIG. 1, a three-dimensional measuring instrument 1 as an industrial machine is provided with a probe as an object to be controlled to measure a measured object that is not shown in the drawing. The three-dimensional measuring instrument 1 has a moving mechanism (also referred to as a mover) that moves the probe in an X-axis direction, a Y-axis direction, and a Z-axis direction (right-and-left direction in FIG. 1) perpendicular to each other; and a controlling device (also called a controller) 3 that controls a position of the probe by controlling a position of the moving mechanism. The moving mechanism is provided with an X-axis direction moving mechanism, a Y-axis direction moving mechanism, and a spindle 2 as a Z-axis direction moving mechanism. The X-axis direction moving mechanism and the Y-axis direction moving mechanism are not shown in the drawing, and the Z-axis direction moving mechanism is shown in FIG. 1. In the following explanation, a configuration and the like related to the spindle 2 as the Z-axis direction moving mechanism only will be explained, and explanations on the others will be omitted.

The spindle 2 is provided with a linear scale 111. The spindle 2 and the linear scale 111 are integrally moved by a driving force from a driving motor 40 along an axis direction of a ball screw 41, which is disposed on the output side of the driving motor 40. A head 112 is fixedly provided to face the linear scale 111, and the linear scale 111 and the head 112 constitute an absolute-type linear encoder 11. The head 112 outputs an absolute position of the spindle 2 in the Z-axis direction from a signal based on the absolute position of the spindle 2 in the Z-axis direction by movement of the spindle 2 and the linear scale 111. The absolute position is sent to the controlling device 3 as a position signal value K1.

A rotary encoder 42 is attached to the driving motor 40. Either one of an incremental type and an absolute type may be used as the rotary encoder 42. The rotary encoder 42 outputs a signal of a pulse waveform based on a rotation angle of the driving motor 40. This signal is sent to the controlling device 3 as a signal value K3.

The controlling device 3 is provided with a motion controller 31 that performs control of a position of the spindle 2, and a host computer 32 that issues a predetermined command to the motion controller 31. The motion controller 31 is provided with a position controller 311, a speed controller 312, and an electric current controller 313. The position controller 311 receives a difference between a position command value K0 in the Z-axis direction from the host computer 32 and an absolute position of the spindle 2 in the Z-axis direction based on the position signal value K1, and performs feedback control to a position of the spindle 2 based on the difference. Also, the position controller 311 outputs a speed command value K2 so as to make the above-described difference 0.

The speed controller 312 receives a difference between the speed command value K2 and a rotation speed of the driving motor 40 based on the signal value K3, and outputs an electric current command value K4 so as to make the difference 0. The electric current controller 313 receives the electric current command value K4, and outputs an electric current command value K5, that is equal to the electric current command value K4, to the driving motor 40. With this, the driving motor 40 is driven based on the electric current command value K5.

The host computer 32 acquires an absolute position of the probe based on an absolute position of the spindle 2 detected by the linear encoder 11. Specifically, a correspondence table, in which an absolute position of the probe and an absolute position of the spindle 2 are associated with each other in advance, is stored in the host computer 32. An absolute position of the probe is acquired based on the correspondence table and an absolute position of the spindle 2 detected by the linear encoder 11.

The three-dimensional measuring instrument 1 of the above-described present embodiment has the following effect. In the three-dimensional measuring instrument 1 of the present embodiment, an absolute position of the spindle 2 is known by the absolute-type linear encoder immediately after power activation, and an absolute position of the probe is known based on the absolute position of the spindle 2. As a result, it is possible to eliminate the need for an operation to detect an original position of the linear encoder 11. Thus, it is possible to start measurement by the three-dimensional measuring instrument 1 in a short period of time.

The present disclosure is not limited to the above-described embodiment. Modifications, improvements, and the like, are covered by the present disclosure as long as the advantage of the present invention is achieved. The above-described embodiment explains the three-dimensional measuring instrument 1 in which the probe is moved along the X-axis direction, the Y-axis direction, and the Z-axis direction. However, an industrial robot and the like is also possible, in which the probe is moved along at least one direction, for example, the X-axis direction. Also, according to the above-described embodiment, an absolute position of the probe is acquired based on the correspondence table stored in advance. However, an absolute position of the probe may be calculated from an absolute position of the spindle 2 detected by the linear encoder 11 by causing the host computer 32 to use a predetermined mathematical formula.

A non-limiting feature of the present disclosure can be used for an industrial machine such as a three-dimensional measuring instrument.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A three-dimensional measuring instrument comprising:
a mover configured to move an object to be controlled in a predetermined direction along an axis;
a controller configured to control a position of the object to be controlled by controlling a position of the moving mechanism;
an absolute-type linear encoder configured to output an absolute position of the mover.

* * * * *